United States Patent [19]

Raggett

[11] Patent Number: 4,654,999
[45] Date of Patent: Apr. 7, 1987

[54] CUTTING DEVICE

[76] Inventor: William C. P. Raggett, 10 Cheeseman Road, Gisborne, New Zealand

[21] Appl. No.: 548,774

[22] Filed: Nov. 4, 1983

[51] Int. Cl.⁴ ............................................. A01G 1/00
[52] U.S. Cl. ......................................................... 47/6
[58] Field of Search .................. 47/6, 7, 1 R; 30/178, 30/192, 229, 230, 134; 7/132, 133, 134

[56] References Cited

U.S. PATENT DOCUMENTS

| 874,571 | 12/1907 | Crampton | 30/229 |
| 4,106,195 | 8/1978 | Berg | 30/229 |
| 4,392,304 | 7/1983 | Plesa | 47/6 |

FOREIGN PATENT DOCUMENTS

| 28588 | 9/1923 | France | 47/6 |
| 1012914 | 10/1954 | France | 47/6 |
| 347781 | 4/1937 | Italy | 30/178 |

Primary Examiner—Robert A. Hafer
Assistant Examiner—Bradley M. Lewis
Attorney, Agent, or Firm—Cushman, Darby & Cushman

[57] ABSTRACT

A cutting device particularly for use in grafting operations involving vines, plants and trees, having lever means (10,11) pivoted at (12) and coupled to a blade mount, the blades (22) of which co-operating with an anvil (25). A guide means (29) locates the vine, rootstock or the like over anvil (25). Movement of levers (10,11) toward each other causes blades (22) to pass downwardly and thus cut, with a shearing action, the vine, rootstock or the like, to form, in the example shown, a V-shaped notch, the other cut out portion of the vine having a V-shaped end. A suitable graft which has been previously cut out with the device is placed in the notch and bound in a conventional manner.

10 Claims, 6 Drawing Figures

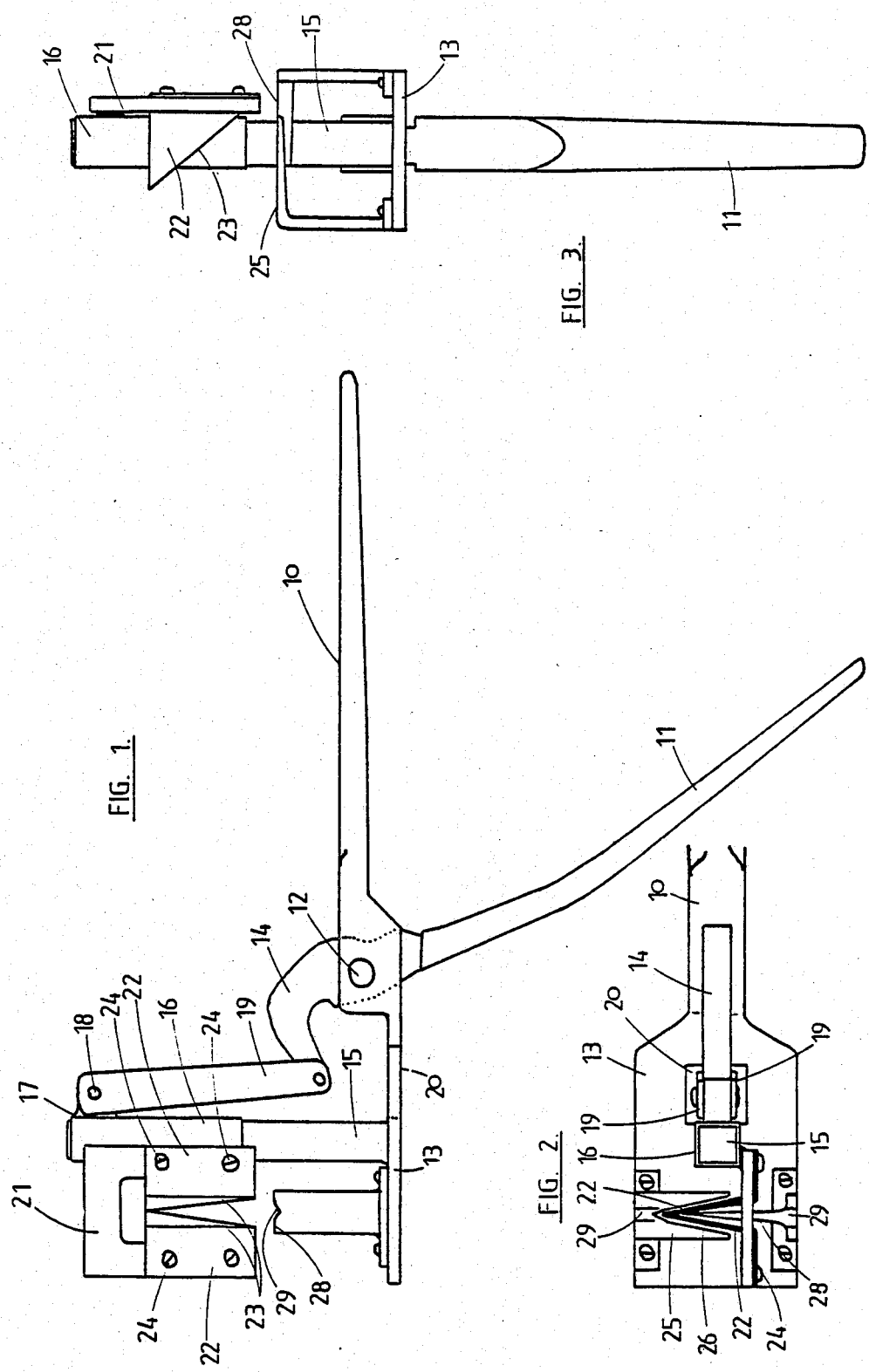

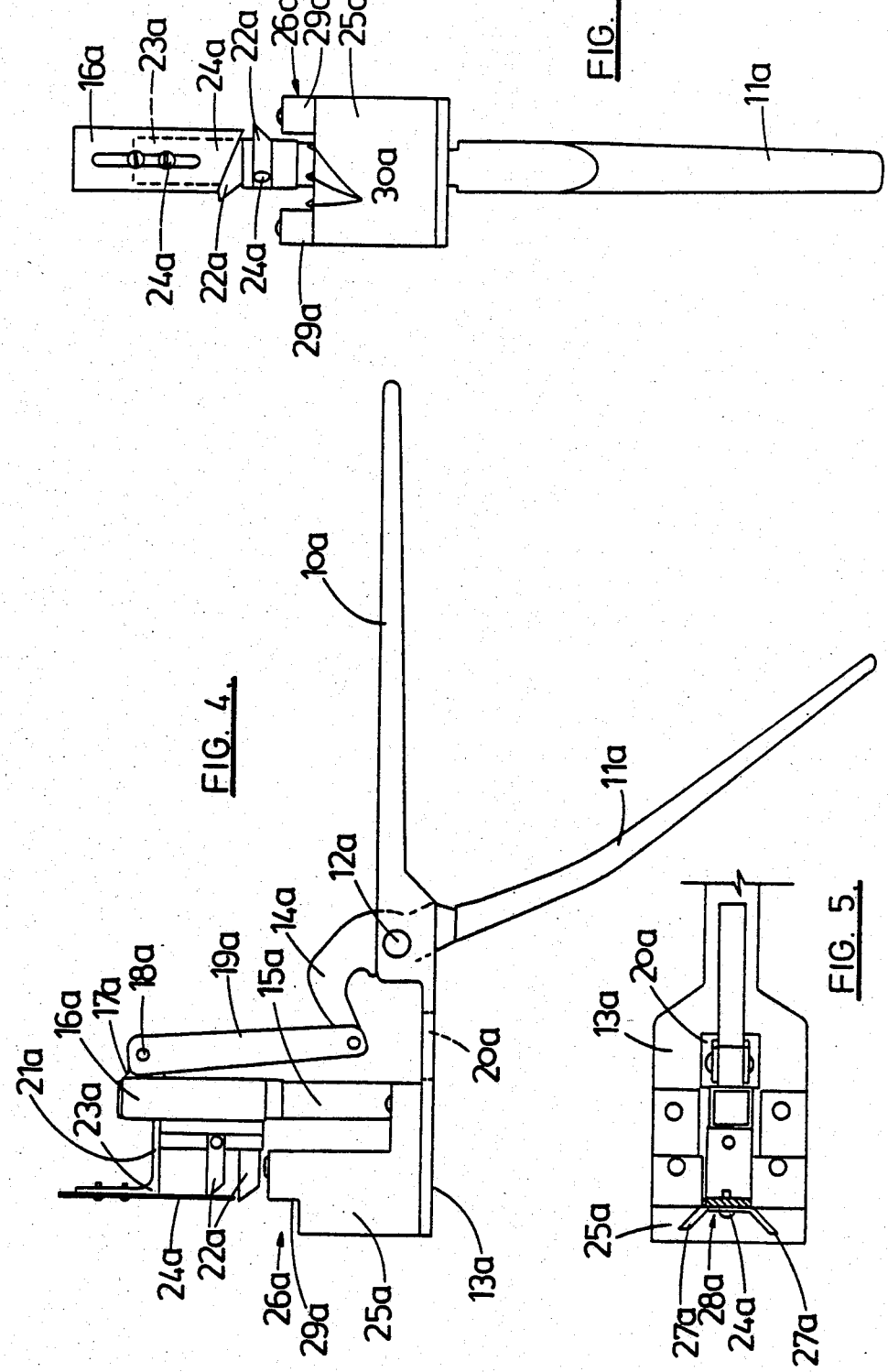

CUTTING DEVICE

This invention relates to a cutting device and more particularly to a cutting device for use in grafting operations involving vines, plants, trees and the like.

When grafting outdoor plants such as kiwi fruit vines, grape vines, fruit trees, flower plants and the like the rootstock/graft is usually cut to form a V-shaped end and this end is then inserted into a slit cut in the graft-/rootstock respectively. This procedure does not always result in a complete face to face mating contact surface between the rootstock and graft consequently there is a high risk of graft failure. It has been found that a greater percentage of successful grafts occur when little or no bruising of the plant takes place and when a good face to face contact between the surfaces to be grafted is present. The latter is achieved by a precision cut made in the rootstock/graft which mates with an equal precision cut in the graft/rootstock. The lack of bruising and good face to face contact results in a quick take and thus quick healing.

The aim of the present invention is to provide a cutting device which in use executes a substantially uniform, patterned cut in both the rootstock and graft to enable these to be joined together with a complete contact surface therebetween.

Broadly the invention consists of a cutting device comprising lever means coupled to a blade mount to enable relative movement of cutting blade means carried by the blade mount toward and away from cooperating anvil means characterised in that the blade means include a pair of blade members and said anvil means includes cutting edges so that said cutting edges cooperate with said blade members during said relative movement and a support anvil located with said cutting anvil so as to support a portion of a plant during said relative movement of said blade members and cutting edges.

To more particularly describe the invention reference will be made to the accompanying drawings in which:

FIG. 1 is a side elevational view of one form of the cutting device according to the invention.

FIG. 2 is a plan view, and

FIG. 3 is a front elevational view,

FIGS. 4–6 are similar to FIGS. 1–3 but illustrate a second form of the cutting device according to the invention.

A pair of levers 10 and 11 are coupled together at their ends by a pivot 12. Each of levers 10 and 11 is shaped into the form of a handle which can be conveniently and comfortably gripped in the hand of a user. Extending from lever 10 beyond pivot 12 is a support base 13 for the anvil means and blade means. Extending from lever 11 beyond pivot 12 is a hook shaped portion 14.

As can be seen in FIG. 1 of the drawings a guide member 15 projects upwardly from base support 13. Slidably mounted on the guide member 15 is a sleeve 16. In the illustrated form the guide member 15 and sleeve 16 are formed of complementary square cross section. A lug 17 projects from the upper end of sleeve 16 and this is pivotally coupled at 18 to a pair of link members 19 which extend downwardly to be pivotally coupled to hook shaped portion 14. Relative movement of levers 10 and 11 toward each other causes link 19 to be drawn downwardly by hooked portion 14 which results in sleeve 16 to moving downwardly on guide member 15.

An opening 20 is provided in base support 13 to accept the lower end of link members 19 and outer end of hooked portion 14 as the sleeve 16 is moved down guide member 15.

Sleeve 16 carries a substantially inverted U-shaped blade mount 21. Attached to each leg of blade mount 21 is a blade member 22. Each blade member 22 has a cutting edge 23 and the blade members are so disposed that the cutting edges converge upwardly and inwardly toward one another as can be clearly seen in FIGS. 1 and 3 of the drawings. These blade members 22 are conveniently mounted on blade mount 21 by fastenings 24 so that they can be readily removed.

The anvil means carried by the base portion 13 consists of a cutting anvil 25 and a central or support anvil 28. Cutting anvil 25 has a V-shaped open ended slot 26 formed therein and the V-shape is of complementary shape to the cross-sectional configuration of the blade members 22. Accordingly as sleeve 16 moves down guide member 15 the cutting edges 23 of blade members 22 pass between the sides of the open ended slot 26 in a guillotine fashion so that a true shearing action results.

Support anvil 28 is of generally V-shape and is located within the confines of the open ended slot 26. Anvil 28 therefore locates within the confines of blade members 22 as sleeve 16 is moved down guide member 15.

Cutting anvil 25 and support anvil 28 each further include a shallow guide recess 29. These guide recesses 29 are located centrally in the anvils and are aligned as can be seen in FIG. 2 of the drawings.

The cutting device according to the invention can be used mounted on a bench whereby support base 13 is fastened to the bench with levers 10 and 11 projecting outwardly from the edge of the bench. The cutting device can equally be used in the field as it is readily portable. This provides a distinct advantage as the operator can use the device for cutting grafts, this may take place within a building or in the field, and then proceed to the field to cut rootstock and apply the grafts. According to a typical use of the cutting device the device would be introduced to say the rootstock of a vine with the vine being located on anvils 25 and 28 and is centralised by the guide recesses 29. Levers 10 and 11 are then moved toward one another which causes the blade members 22 to pass downwardly and thus cut, with a shearing action and thus little bruising, the rootstock with one portion having a V-shaped slot and the other portion having a V-shaped end. The operator then selects a graft which is of substantially the same diameter as the rootstock, this graft having previously been cut using the cutting device. This graft will have a V-shaped slot in its end which can be then placed over the V-shaped end of the rootstock and the two pieces bound together in the normal manner. Alternatively the graft can have the V-shaped end and the rootstock the V-shaped slotted end.

Referring now to FIGS. 4–6 a second form of the cutting device is illustrated. This embodiment of the device is more suitable for cutting whole stock such as well established vines, exotic nuts, citrus trees and roses.

The device is of similar construction to the first described embodiment and has levers 10a and 11a pivoted at 12a with a hook shaped portion of lever 11a coupled via links 19a to the attachment lug 17a of sleeve 16a. Lever 10a has a base support 13a with guide member 15a on which sleeve 16a can slide.

Sleeve 16a has fastened thereto a blade mount 21a. Mounted thereto and disposed above one another are blade members 22a. The blades are angled to one another such that they are disposed in a V shaped manner when viewed in plan. A bracket 23a is fastened to sleeve 16a and affixed thereto is a further blade member 24a which is positioned between the ends of blades 22a. Blades 22a and 24a thus form a substantially dovetail shape cutting profile when viewed in plan. Blades 22a and 24a are conveniently provided with guillotine shaped cutting edges and are mounted on blade mount 21a by fastenings 24a so that they can be readily removed.

The anvil means carried by the base portion 13a consists of a cutting anvil 25a and plant stem support anvil 26a. Cutting anvil 25a has a pair of open ended slots 27a formed therein and the spacing and angle thereof is of complementary shape to the cross sectional configuration of the blade members 22a. The anvil 25a also includes a shear edge 28a which is complementary to blade member 24a. Accordingly as sleeve 16a moves down guide member 15a the cutting edges of blades 22a and 24a pass between the sides of the open ended slots 27a and shear edge 28a respectively.

The plant stem support anvil 26a is formed by a wall 29a which is disposed to be aligned with shear edge 28a of the cutting anvil 25a. Expediently pins 30a may be provided to securely locate the plant stem when located thereon.

The cutting device according to the invention can, as with the first embodiment, be used mounted on a bench or be used in the field. Levers 10 and 11 when moved toward one another cause the blades 22 and 24 to pass downwardly and thus cut a rootstock located on support anvil 26a with one portion having a substantially dovetail slot and the other portion having a substantially dovetail end. The operator then selects a graft which is of substantially the same diameter as the rootstock, this graft having previously been cut using the cutting device. This graft will have a dovetail end which can then be placed over the dovetail of the rootstock and the two pieces bound together in the normal manner. Alternatively, the graft can have the dovetail end and the rootstock the dovetail slotted end.

As the device cuts both the graft and the rootstock with a uniform cutting pattern the cut portions of the graft and rootstock can be mated together so as to give a complete contact surface therebetween. This is achieved because both the rootstock and graft are located in the cutting device such that substantially uniform patterned cuts are formed in both the rootstock and graft. Due to the complete contact surface engagement between the mating graft and rootstock there is far less risk of graft failure as the contact surfaces are not only completely in contact with one another but are enclosed within the confines of the vine and graft binding.

The cutting device is portable and can be readily used in any environment where the vines, trees, plants etc and their rootstock are growing. The ability to be able to always execute a substantially uniform patterned cut allows grafts to be made where there is a complete contact surface thereby lessening the risk of graft failure.

What is claimed is:

1. A portable cutting device adapted to be held and operated with one hand of an operator comprising a base member, a fixed handle projecting from said base member, a lever handle pivotally mounted to said fixed handle adjacent said base member, a fixed rigid guide member of angular cross-section projecting upwardly from said base member, a blade mount having a rigid sleeve of corresponding angular internal cross-section to that of the guide member, said sleeve being slidingly engaged on said guide member but, due to the angular cross-section of both the guide member and sleeve, being restrained from rotational movement, at least one blade member mounted by said blade mount, support means mounted by said base member, said support means having a support surface on which a scion or rootstock can be located for cutting, said sleeve being pivotally coupled to one end of link means which is in turn pivotally coupled at its other end to an extension of said lever beyond the pivot mount between said handles, said support means having an opening formed therein which is of dimensions and shape such as to permit at least a portion of said blade member to pass therethrough as the lever handle is moved about the pivot mount toward the fixed handle.

2. A portable cutting device as claimed in claim 1 wherein said lever extension is of hook shape there being an opening or recess in the said base member to accommodate said hook shape and said other end of the link means during movement of the lever handle toward said fixed handle.

3. A portable cutting device as claimed in claim 2 wherein the base member is substantially flat and is formed integrally with said fixed handle, said guide member being located substantially at right angles to the surface of said base member.

4. A portable cutting device as claimed in claim 3 wherein the blade mount comprises a first portion mounted with the sleeve and a second portion which is located outwardly of said guide means there being a blade member mounted by the respective first and second portions of said blade mount.

5. A portable cutting device is claimed in claim 4 wherein each of the said blade members has a longitudinal cutting edge which is located at an angle to the direction in which the blade members are moved toward the support surface, said longitudinal cutting edges diverging away from one another in the direction in which the blade members are movable toward the support surface.

6. A portable cutting device as claimed in claim 5 wherein the blade members are disposed in a direction which is transverse to the longitudinal direction in which the fixed handle extends from said base member.

7. A portable cutting device as claimed in claim 3 wherein the support surface includes location means for locating said scion or rootstock.

8. A portable cutting device as claimed in claim 3 wherein said cutting members provide a first cutting edge which forms a cut in the scion or rootstock which is substantially parallel to the longitudinal axis of said scion or rootstock and second cutting edges which form outwardly diverging cuts from each end of the cut formed by said first cutting edge.

9. A portable cutting device as claimed in claim 8 wherein said first cutting edge is formed as part of a first blade member and said second cutting edges are formed by second and third cutting members, the second and third cutting members being in a staggered relationship with the said second cutting edges thereof being angled downwardly in the direction of rectilinear movement of the blade mount toward the support means.

10. A portable cutting device as claimed in claim 7 wherein the location means are a plurality of upwardly projecting pointed elements.

* * * * *